(12) United States Patent
Imanishi (10) Patent No.: US 11,806,876 B2
(45) Date of Patent: Nov. 7, 2023

(54) CONTROL SYSTEM, CONTROL APPARATUS, AND ROBOT

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 279 days.

(21) Appl. No.: 17/009,122

(22) Filed: Sep. 1, 2020

(65) Prior Publication Data

US 2021/0107148 A1  Apr. 15, 2021

(30) Foreign Application Priority Data

Oct. 15, 2019 (JP) ................. 2019-188337

(51) Int. Cl.
*B25J 9/16* (2006.01)
*B25J 9/00* (2006.01)

(52) U.S. Cl.
CPC ............ *B25J 9/1643* (2013.01); *B25J 9/0081* (2013.01); *B25J 9/163* (2013.01); *B25J 9/1658* (2013.01); *B25J 9/1666* (2013.01)

(58) Field of Classification Search
CPC ......... B25J 9/0081; B25J 9/163; B25J 9/1658
See application file for complete search history.

(56) References Cited

U.S. PATENT DOCUMENTS

2016/0136805 A1* 5/2016 Søe-Knudsen .... G05B 19/4083
  700/254
2018/0099422 A1* 4/2018 Yoon ........................ B25J 19/06
(Continued)

FOREIGN PATENT DOCUMENTS

JP  2000-015593 A  1/2000
JP  2001-154717     6/2001
(Continued)

OTHER PUBLICATIONS

Yanjiang Huang, Kinematic Control With Singularity Avoidance for Teaching-Playback Robot Manipulator System, Apr. 2016, IEEE Transactions on Automation Science and Engineering, vol. 13, No. 2, pp. 729-740. (Year: 2016).*

*Primary Examiner* — Khoi H Tran
*Assistant Examiner* — Aaron G Cain
(74) *Attorney, Agent, or Firm* — Wenderoth, Lind & Ponack, L.L.P.

(57) ABSTRACT

A control apparatus includes an operation unit that teaches the robot a position, a posture changing instruction unit that instructs a position change when the robot passes through a singularity or its vicinity, a singularity passing motion request unit that instructs the robot to change its posture, a robot drive information request unit that acquires robot drive information, and a robot G-code generation unit that inserts a G-code from the robot drive information into a program. A robot includes a drive control unit that drives the robot, a singularity determination unit that determines passage through the singularity or its vicinity, a singularity passing pattern generation unit that generates a motion plan for passage through the singularity or its vicinity based on the changed posture, and a robot drive information output unit that transmits the robot drive information to the control apparatus.

5 Claims, 6 Drawing Sheets

(56) References Cited

U.S. PATENT DOCUMENTS

2018/0236459 A1* 8/2018 Clark ..................... G06F 21/80
2020/0139546 A1* 5/2020 Kerfeld ............... B25J 11/0055

FOREIGN PATENT DOCUMENTS

| JP | 2010-201592 A | 9/2010 |
| JP | 2015-202536 A | 11/2015 |
| JP | 2020-171989 A | 10/2020 |

* cited by examiner

CONTROL SYSTEM, CONTROL APPARATUS, AND ROBOT

This application is based on and claims the benefit of priority from Japanese Patent Application No. 2019-188337, filed on 15 Oct. 2019, the content of which is incorporated herein by reference.

BACKGROUND OF THE INVENTION

Field of the Invention

The present invention relates to a control system, a control apparatus, and a robot.

Related Art

In processing using a machine tool, a robot has been used for, e.g., a work attachment/detachment process for the purpose of automation. In this case, it is necessary to teach the robot a predetermined working motion. However, although a teaching operation for the robot is performed using a teaching control board for the robot, a user of the machine tool is unaccustomed to handling the teaching control board for the robot, and in some cases, it is difficult for the user to perform such an operation themself.

For example, an integrated system of a robot and a machine tool has been disclosed, the integrated system being capable of operating the robot by a control unit of the machine tool. See Patent Document 1, for example.

Patent Document 1: Japanese Unexamined Patent Application, Publication No. 2001-154717

SUMMARY OF THE INVENTION

In the teaching operation for the robot, the operation of moving the robot to a desired position while pressing a key for specifying a robot motion direction, i.e., jog operation, is performed, the key being arranged on the teaching control board. Such a jog operation method includes orthogonal jog operation and each-axis jog operation. The orthogonal jog operation is the operation of teaching the robot a desired position to which the robot moves based on the directions of an X-axis, a Y-axis, and a Z-axis of an orthogonal coordinate system fixed to the robot. In this case, for moving the hand tip of the robot to the taught position, the robot performs not only translational motion in the directions of the X-axis, the Y-axis, and the Z-axis but also the posture changing motion of rotating the hand tip of the robot about each axis. On the other hand, the each-axis jog operation is the operation of teaching the robot the desired movement destination position by moving the robot in a direction about the axis of each robot joint axis. The orthogonal jog operation is operation based on the orthogonal coordinate system easily understandable by a human, and therefore, the user often performs the teaching operation for the robot by the orthogonal jog operation.

When the direction of movement of the hand tip of the robot is specified by the orthogonal jog operation and a target position is generated accordingly, the rotation angle of each joint axis is calculated from the target position based on inverse kinematic calculation. Based on the calculated rotation angle, each joint axis is controlled such that the hand tip of the robot moves to the target position. However, in a case where the solution of the inverse kinematic calculation cannot be obtained from the target position, it is difficult to control the robot. For example, at a target position that the robot is in such a posture that the rotation axes of two or more joint axes are in line, the rotation angles of these joint axes cannot be uniquely set, and for this reason, such a position is called a "singularity" and the robot cannot be moved to such a singularity. Particularly, it is often necessary for the robot to pass through the singularity when the robot enters the machine tool to perform work attachment/detachment motion. In this case, the robot cannot be operated by the orthogonal jog operation, and when the robot passes through and crosses the singularity, the orthogonal jog operation needs to be switched to the each-axis jog operation not requiring the inverse kinematic calculation.

However, it is difficult for the machine tool user unaccustomed to the robot to grasp the singularity and operate the robot.

For this reason, there has been demand for a robot motion program that is easily produced without the need to consider the singularity.

(1) One aspect of a control system of the present disclosure is a control system including a control apparatus that can teach a robot position and a robot to be operated according to position teaching. The control apparatus includes an operation unit that teaches the robot the position based on operation by a user, a posture changing instruction unit that instructs the robot to change the posture in the case of receiving, from the robot, a notice that the robot passes through a singularity or the vicinity thereof when moving to the taught position, a singularity passing motion request unit that transmits the instruction for changing the posture to the robot such that the robot passes through the singularity or the vicinity thereof in the posture instructed by the posture changing instruction unit, a robot drive information request unit that requests the robot to provide robot drive information indicating a drive status of the robot when the robot passes through the singularity or the vicinity thereof and acquires the robot drive information, and a robot G-code generation unit that generates a G-code corresponding to motion of the robot based on the robot drive information acquired by the robot drive information request unit and inserts the generated G-code into a program. The robot includes a drive control unit that drives the robot, a singularity determination unit that determines whether or not the robot passes through the singularity or the vicinity thereof when moving to the position taught by the control apparatus and transmits a notice that the robot passes through the singularity or the vicinity thereof to the control apparatus in a case where the robot passes through the singularity or the vicinity thereof, a singularity passing pattern generation unit that generates, in the case of receiving the instruction for changing the posture of the robot from the control apparatus, a motion plan based on the changed posture such that the robot passes through the singularity or the vicinity thereof and causes the drive control unit to drive the robot based on the generated motion plan, and a robot drive information output unit that transmits the robot drive information to the control apparatus in the case of receiving a request for the robot drive information from the control apparatus.

(2) One aspect of a control apparatus of the present disclosure includes an operation unit that teaches a robot as a control target a position based on operation by a user, a posture changing instruction unit that instructs the robot to change the posture in the case of receiving, from the robot, a notice that the robot passes through a singularity or the vicinity thereof when moving to the taught position, a singularity passing motion request unit that transmits the instruction for changing the posture to the robot such that the robot passes through the singularity or the vicinity thereof in the posture instructed by the posture changing instruction unit, a robot drive information request unit that requests the robot to provide robot drive information indicating a drive status of the robot when the robot passes through the singularity or the vicinity thereof and acquires the robot drive information, and a robot G-code generation unit that generates a G-code corresponding to the robot based on the robot drive information acquired by the robot drive information request unit and inserts the generated G-code into a program.

(3) One aspect of a robot of the present disclosure is a robot operating according to position teaching by a control apparatus that can teach the position of the robot. The robot includes a drive control unit that drives the robot, a singularity determination unit that determines whether or not the robot passes through a singularity or the vicinity thereof when moving to the position taught by the control apparatus and transmits a notice that the robot passes through the singularity or the vicinity thereof to the control apparatus in a case where the robot passes through the singularity or the vicinity thereof, a singularity passing pattern generation unit that generates, in the case of receiving an instruction for changing the posture of the robot from the control apparatus, a motion plan based on the changed posture such that the robot passes through the singularity or the vicinity thereof and causes the drive control unit to drive the robot based on the generated motion plan, and a robot drive information output unit that transmits robot drive information to the control apparatus in the case of receiving a request for the robot drive information from the control apparatus, the robot drive information indicating a drive status of the robot when the robot passes through the singularity or the vicinity thereof.

According to one aspect, the robot motion program can be easily produced without the need to consider the singularity.

DETAILED DESCRIPTION OF THE INVENTION

One Embodiment

First, the outline of the present embodiment will be described. In the present embodiment, a control system includes a control apparatus and a robot. The control apparatus teaches the robot a position based on user's operation, and instructs the robot to change the posture thereof in the case of receiving, from the robot, a notice that the robot passes through the singularity or the vicinity thereof when moving to the taught position. The control apparatus requests the robot to pass through the singularity or the vicinity thereof in the instructed posture. The control apparatus acquires robot drive information indicating a robot drive status when the robot passes through the singularity or the vicinity thereof, generates a G-code corresponding to the robot based on the acquired robot drive information, and inserts the generated G-code into a program.

With this configuration, according to the present embodiment, it is possible to solve the above-described problem that "a robot motion program that is easily produced without the need to consider the singularity".

The outline of the present embodiment has been described above.

Next, the configuration of the present embodiment will be described in detail with reference to the drawings.

Note that unless otherwise provided, a singularity or the vicinity thereof will be also referred to as the "vicinity of a singularity" in description below.

Figure 1:
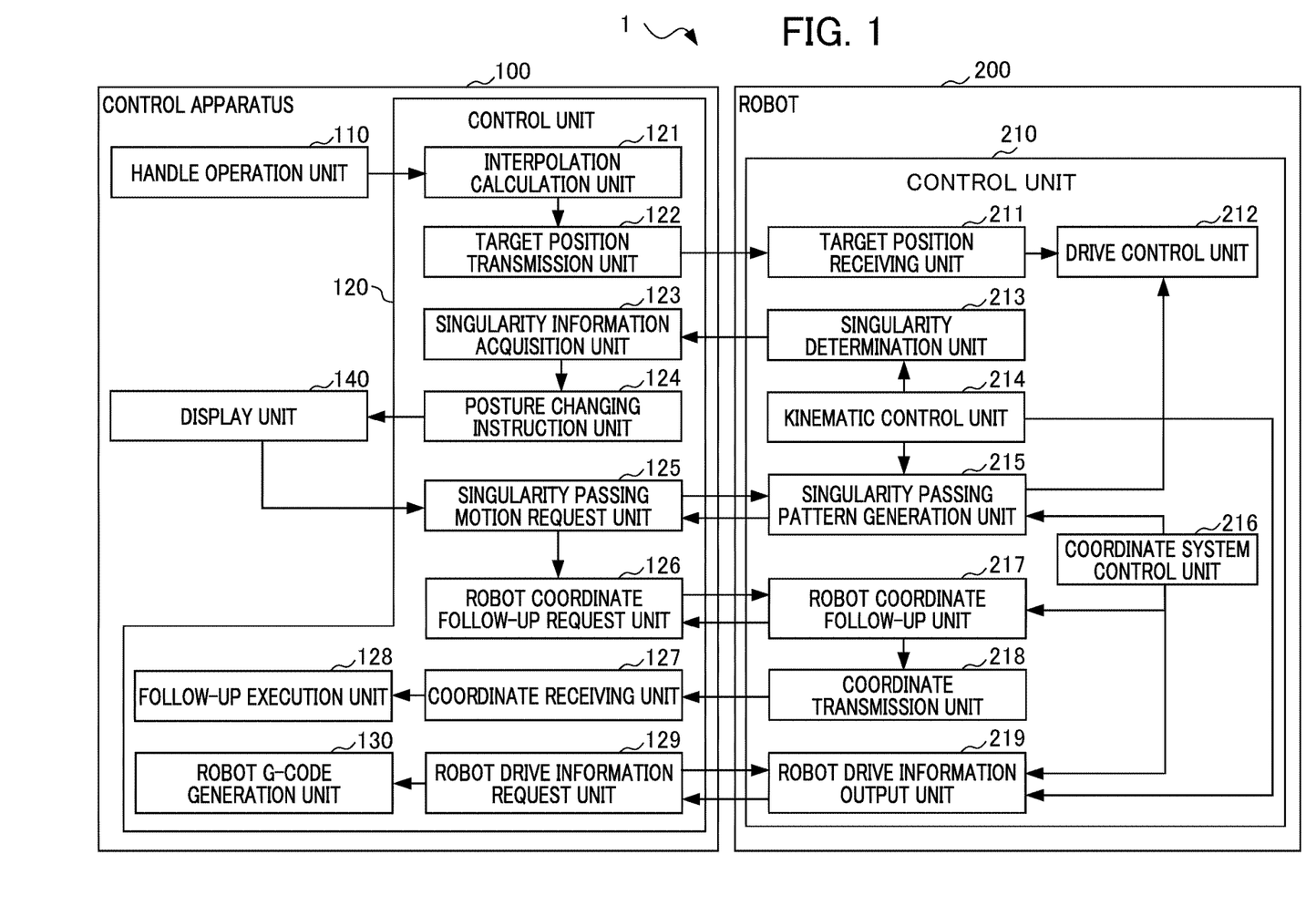
FIG. 1 is a functional block diagram showing a functional configuration example of a control system according to one embodiment.

FIG. 1 is a functional block diagram showing a functional configuration example of a control system 1 according to one embodiment.

The control system 1 has a control apparatus 100 and a robot 200. The control apparatus 100 and the robot 200 may be directly connected to each other via a not-shown connection interface. Note that the control apparatus 100 and the robot 200 may be connected to each other via a not-shown network such as a local area network (LAN) or the Internet. In this case, the control apparatus 100 and the robot 200 include not-shown communication units that communicate with each other via such connection.

<Control Apparatus 100>

The control apparatus 100 is a numerical control apparatus that can teach the position of the robot 200, and generates a motion program for the robot 200 according to position teaching.

As shown in FIG. 1, the control apparatus 100 has a handle operation unit 110, a control unit 120, and a display unit 140. Further, the control unit 120 has an interpolation calculation unit 121, a target position transmission unit 122, a singularity information acquisition unit 123, a posture changing instruction unit 124, a singularity passing motion request unit 125, a robot coordinate follow-up request unit 126, a coordinate receiving unit 127, a follow-up execution unit 128, a robot drive information request unit 129, and a robot G-code generation unit 130.

The handle operation unit 110 has a handle for user's manual operation, the handle being provided for adjusting each of the positions of multiple joint axes included in the later-described robot 200 in, e.g., an orthogonal coordinate system of an X-axis, a Y-axis, and a Z-axis. The handle operation unit 110 outputs, for example, a signal of a pulse train corresponding to the number of rotations of the rotary handle. As described above, the handle operation unit 110 is used so that a user of a machine tool can operate the robot 200 in the accustomed orthogonal coordinate system.

Note that a single handle operation unit 110 may be provided for the multiple joint axes of the robot 200, or multiple handle operation units 110 may be provided for the multiple joint axes in one-to-one correspondence, i.e., may be each provided for each of the multiple joint axes.

The control unit 120 has a CPU, a ROM, a RAM, a CMOS memory, etc., and these components are those well-known by those skilled in the art and configured communicable with each other via a bus.

The CPU is a processor that controls the control apparatus 100 as a whole. The CPU reads, via the bus, a system program and an application program stored in the ROM, thereby controlling the entirety of the control apparatus 100 according to the system program and the application program. With this configuration, the control unit 120 is, as shown in FIG. 1, configured to implement the functions of the interpolation calculation unit 121, the target position transmission unit 122, the singularity information acquisition unit 123, the posture changing instruction unit 124, the singularity passing motion request unit 125, the robot coordinate follow-up request unit 126, the coordinate receiving unit 127, the follow-up execution unit 128, the robot drive information request unit 129, and the robot G-code generation unit 130. The RAM stores various types of data such as temporary calculation data and display data. The CMOS memory is backed up by a not-shown battery, and is configured as a non-volatile memory that holds a storage state even if the control apparatus 100 is powered off.

The interpolation calculation unit 121 calculates a target position (a teaching position) of the robot 200 based on the pulse train signal received from the handle operation unit 110.

The target position transmission unit 122 transmits, to the robot 200, the target position calculated by the interpolation calculation unit 121.

The singularity information acquisition unit 123 receives a notice that the robot 200 passes through the vicinity of the singularity in a case where a singularity determination unit 213 of the later-described robot 200 has determined that the robot 200 passes through the vicinity of the singularity when the robot 200 moves to the target position transmitted by the target position transmission unit 122.

Note that the vicinity of the singularity is a preset predetermined area about the singularity as the center.

The posture changing instruction unit 124 displays a message of the above-described notice on the later-described display unit 140 in a case where the notice that the robot 200 passes through the vicinity of the singularity has been received by the singularity information acquisition unit 123. Moreover, the posture changing instruction unit 124 displays, on the display unit 140, a message prompting the robot 200 to change the posture thereof such that the robot 200 passes through the vicinity of the singularity. The posture changing instruction unit 124 receives an instruction for changing the posture of the robot 200 by user's input operation via an input apparatus (not shown) included in the control apparatus 100, such as a touch panel. Note that displaying of the message, the contents of the instruction for changing the posture of the robot 200, etc. will be described later.

The singularity passing motion request unit 125 transmits the instruction for changing the posture to the robot 200 such that the robot 200 passes through the vicinity of the singularity in the posture instructed by the posture changing instruction unit 124. Moreover, the singularity passing motion request unit 125 receives, from the robot 200, a completion notice indicating completion of passage through the singularity in a case where the robot 200 has passed through the vicinity of the singularity.

The robot coordinate follow-up request unit 126 transmits a follow-up request to the robot 200 in a case where the singularity passing motion request unit 125 has received the completion notice. Thereafter, the robot coordinate follow-up request unit 126 receives, from the robot 200, a completion notice indicating that transmission of coordinate information regarding the coordinate system set for the robot 200 has been completed.

The coordinate receiving unit 127 receives the above-described coordinate information from the robot 200.

The follow-up execution unit 128 updates a coordinate value of the robot 200 based on the coordinate information received by the coordinate receiving unit 127 in a case where the robot coordinate follow-up request unit 126 has received the completion notice.

The robot drive information request unit 129 requests the robot 200 to provide robot drive information indicating a drive status of the robot 200 when the robot 200 passes through the vicinity of the singularity, thereby acquiring the robot drive information from the robot 200.

The robot drive information includes a form indicating the posture of the robot 200, the number of rotations of the joint axis corresponding to the wrist of the robot 200, the set coordinate system, and the coordinate value indicating the posture of the robot 200.

The robot G-code generation unit 130 generates a G-code corresponding to motion of the robot 200 based on the robot drive information acquired by the robot drive information request unit 129, and inserts the generated G-code into a program.

Figure 2:
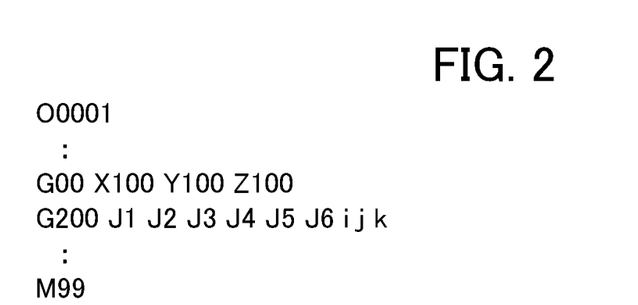
FIG. 2 is a view showing one example of a program into which a G-code generated corresponding to motion of a robot by a robot G-code generation unit is inserted.

FIG. 2 is a view showing one example of the program into which the G-code generated corresponding to motion of the robot 200 by the robot G-code generation unit 130 is inserted.

As shown in FIG. 2, "00001" in a first row indicates a program number.

"G00" in a second row is a command for positioning a starting point. "X100 Y100 Z100" specifies movement to coordinates of (X, Y, Z)=(100, 100, 100).

"G200" in a third row is a command causing the robot 200 to pass through the vicinity of the singularity. "J1, J2, J3, J4, J5, J6" indicates a case where the robot 200 is a six-axis vertical articulated robot, and the value of the rotation angle of each of six axes in the robot drive information when the robot 200 moves to the target position is set. In other words, the G-code generated by the robot G-code generation unit 130 and causing the robot 200 to pass through the vicinity of the singularity is one changed from an orthogonal mode in the second row to an each-axis mode. With this configuration, the robot 200 can pass through and cross the vicinity of the singularity even in a case where the solution of the inverse kinematic calculation cannot be obtained.

Last characters "i j k" are parameters each indicating the form indicating the posture of the robot 200 after passage through the singularity, the number of rotations of the joint axis corresponding to the wrist of the robot 200, and the curvature of movement of the hand tip of the robot 200 as indicated by the robot drive information. The curvature k of movement is, for example, set to a value from "1%" to "100%", and the hand tip of the robot 200 moves with a more-smooth curve as the set value increases.

"M99" in a fourth row is a command for ending the program of FIG. 2.

With this configuration, the control apparatus 100 inserts the G-code for the robot 200 so that even a machine tool user with no expertise in a robot can easily produce the robot motion program.

Note that "G200" has been described as the command causing the robot 200 to pass through the vicinity of the singularity, but the present disclosure is not limited to such a configuration. An optional G-code may be assigned.

Moreover, in a case where the robot 200 does not pass through the singularity when moving to the target position, the robot G-code generation unit 130 may generate the G-code in the orthogonal mode to insert the generated G-code into the program. For example, the robot G-code generation unit 130 may generate a G-code of "G01 X100.0 Y0.0 2200.0 A0.0 B-45.0 C0.0" for cutting (linear) feed in the orthogonal mode, and may insert the G-code into the program. A, B, and C described herein indicate the rotation angles about the X-axis, the Y-axis, and the Z-axis. Alternatively, the robot G-code generation unit 130 may generate a G-code of "G01 J1 100.0 J2 30.0 J3 95.5 J4 10.2 J5 45.0 J6 0.0" for cutting (linear) feed in the each-axis mode.

Figure 3:
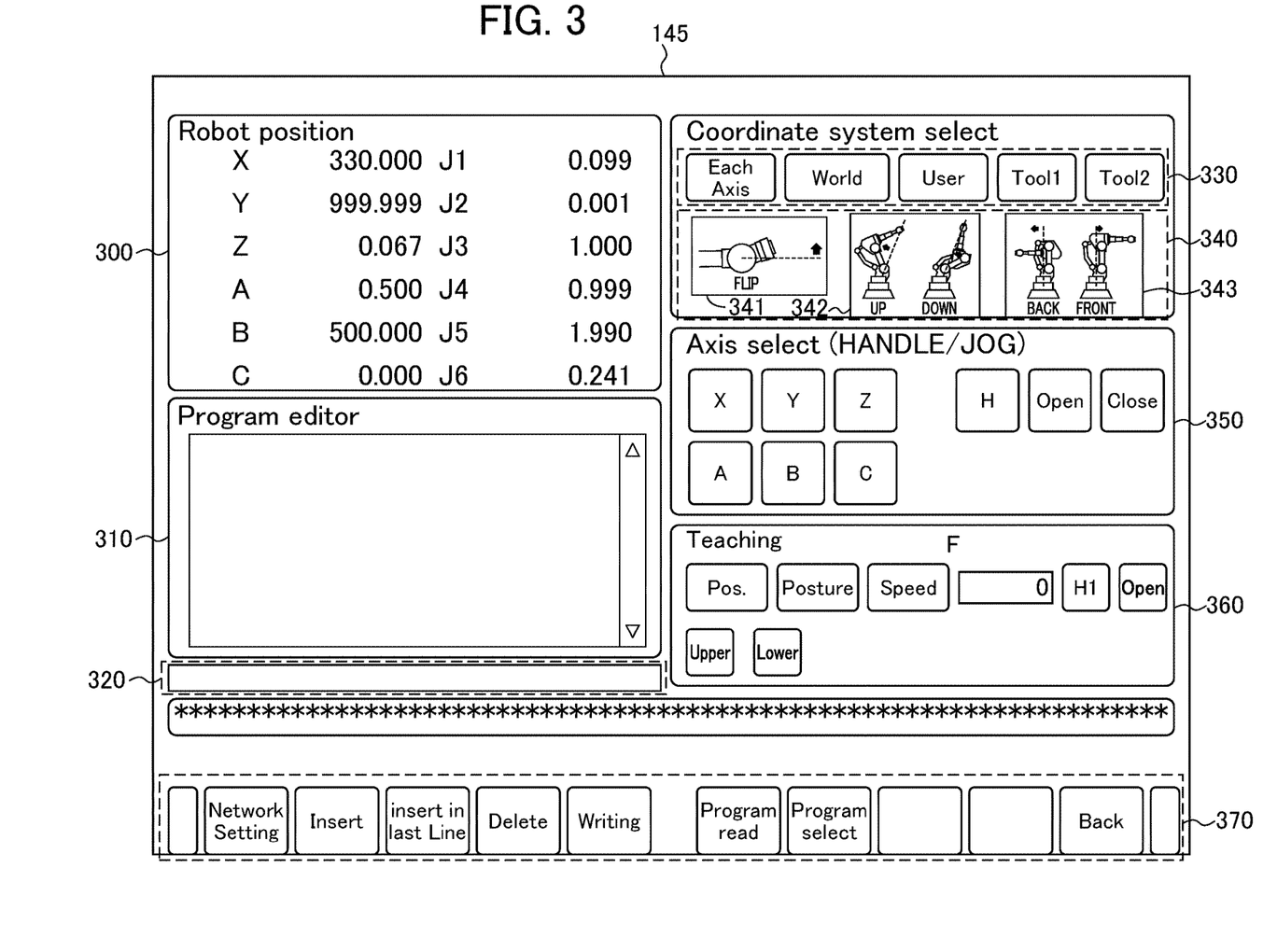
FIG. 3 is a view showing one example of a robot position teaching screen.

The display unit 140 is, for example, a liquid crystal display, and displays various types of information according to control by the control unit 120. For example, the display unit 140 displays a robot position teaching screen 145.

FIG. 3 is a view showing one example of the robot position teaching screen 145.

As shown in FIG. 3, the robot position teaching screen 145 has a coordinate display area 300 that displays the position of the robot 200 in the orthogonal coordinate system and an each-axis coordinate system and an editor display area 310 that displays a program editor for producing/editing the program. Moreover, the robot position teaching screen 145 has an input display area 320 that displays, e.g., the G-code and the set value input to the program editor and a coordinate switching key display area 330 that displays coordinate switching keys for changing the coordinate system for the robot 200. Further, the robot position teaching screen 145 has a posture change display area 340 that displays posture change key icons 341 to 343 for receiving the instruction for changing the posture of the robot 200 based on user's operation and a selection key display area 350 that displays selection keys for selecting an axis targeted for manual operation (the jog operation) by the handle operation unit 110. In addition, the robot position teaching screen 145 has a teaching display area 360 that displays position teaching keys for importing the position (X, Y, Z) and posture (A, B, C) of the robot 200, a button for setting a movement speed, keys for setting opening/closing of the hand provided at the hand tip of the robot 200, and a row specifying key for specifying a program row to be produced/edited by the program editor. Moreover, the robot position teaching screen 145 has a soft key display area 370 that displays multiple soft keys.

As described above, in a case where the notice that the robot 200 passes through the vicinity of the singularity has been received by the singularity information acquisition unit 123, the posture changing instruction unit 124 may display a message of the notice, such as "COMING NEAR SINGULARITY", on the display unit 140 with the message being superimposed on the robot position teaching screen 145 of FIG. 3. In this case, the posture changing instruction unit 124 may display a message such as "PLEASE SELECT ROBOT POSTURE CHANGE FOR PASSING THROUGH SINGULARITY" on the display unit 140 with the message being superimposed on the robot position teaching screen 145. Moreover, the posture changing instruction unit 124 causes the user to select any one of the posture change key icons 341 to 343 displayed on the posture change display area 340 of the robot position teaching screen 145 via the input apparatus (not shown) of the control apparatus 100, thereby receiving the instruction for changing the posture of the robot 200.

With this configuration, when the robot 200 comes near the singularity during position teaching for the robot 200 in the orthogonal coordinate system, the control apparatus 100 can cause, without user's trial and error, the robot 200 to perform motion such that the robot 200 passes through and crosses the vicinity of the singularity, operability can be improved, and a user's burden can be reduced.

Note that the posture change key icon 341 is an icon for instructing the joint axis of the wrist of the later-described robot 200 to change from an upward orientation to a downward orientation or from the downward orientation to the upward orientation. Moreover, the posture change key icon 342 is an icon for instructing the joint axis of the elbow of the robot 200 to change from an upward orientation to a downward orientation or from the downward orientation to the upward orientation. Further, the posture change key icon 343 is an icon for instructing the robot 200 to change the orientation thereof from a forward orientation to a backward orientation or from the backward orientation to the forward orientation.

Since the coordinate switching key display area 330 displays the coordinate switching keys for changing the coordinate system of the robot 200 to any of the "each-axis coordinate system", a "world coordinate system", a "user coordinate system", a "tool coordinate system 1", and a "tool coordinate system 2", a code for changing the coordinate system of the robot 200 may be prepared in advance as the G-code generated by the robot G-code generation unit 130. In this case, "G201" may specify the each-axis coordinate system as the coordinate system of the robot 200, for example. Moreover, "G202" may specify the world coordinate system as the coordinate system of the robot 200. Further, "G203" may specify the tool coordinate system 1 as the coordinate system of the robot 200. In addition, "G204" may specify the tool coordinate system 2 as the coordinate system of the robot 200. Moreover, "G205" may specify the user coordinate system as the coordinate system of the robot 200.

<Robot 200>

Figure 4:
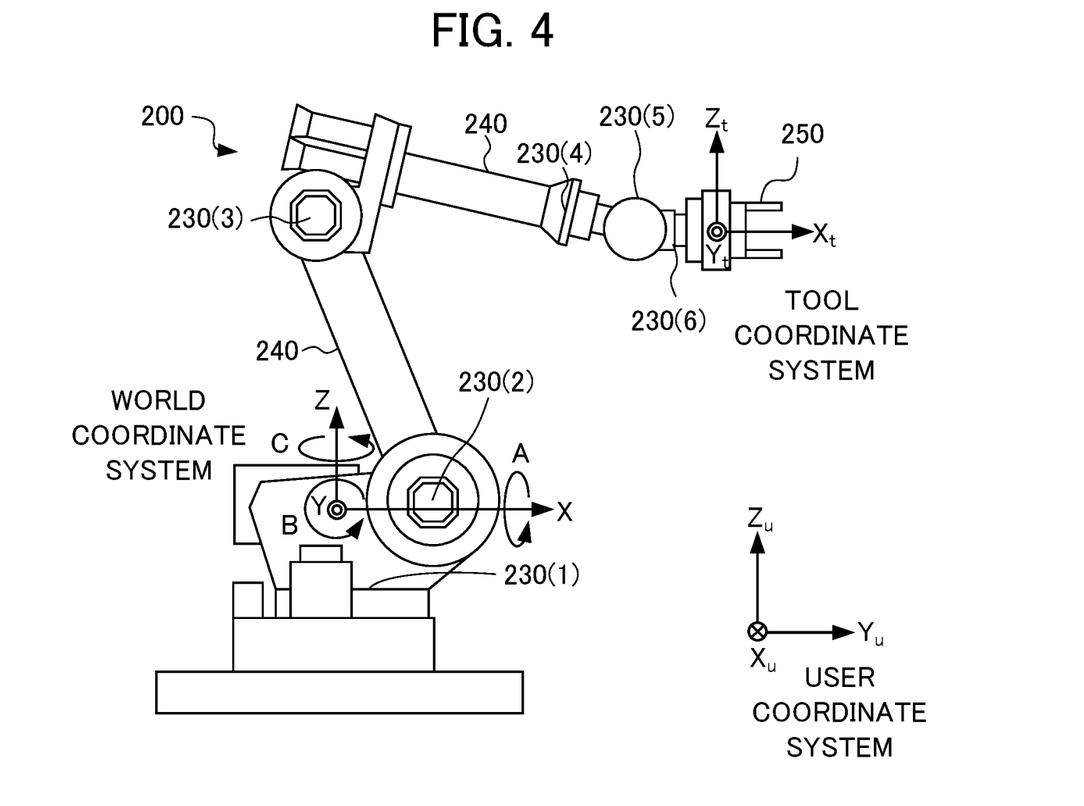
FIG. 4 is a view showing one example of the robot.

FIG. 4 is a view showing one example of the robot 200.

As shown in FIG. 4, the robot 200 is, for example, a six-axis vertical articulated robot, and has six joint axes 230(1) to 230(6) and arm portions 240 coupled to each other by the joint axes 230(1) to 230(6). The robot 200 drives, based on a drive command from the control apparatus 100, a servomotor (not shown) arranged at each of the joint axes 230(1) to 230(6), thereby driving movable members such as the arm portions 240. Moreover, an end effector 250 such as a gripping hand is, for example, attached to a tip end portion of the movable member of the robot 200, such as a tip end portion of the joint axis 230(6).

The joint axis 230(1) described herein is a joint for rotating the orientation of the robot 200. Moreover, the joint axis 230(3) is a joint corresponding to the elbow of the robot 200. Further, the joint axis 230(5) is a joint corresponding to the wrist of the robot 200.

Note that the robot 200 has been described as the six-axis vertical articulated robot, but may be a vertical articulated robot other than the six-axis vertical articulated robot or may be, e.g., a horizontal articulated robot or a parallel link robot.

Moreover, in a case where it is not necessary to distinguish the joint axes 230(1) to 230(6) from each other, these axes will be hereinafter collectively referred to as "joint axes 230".

FIG. 4 shows the world coordinate system as a three-dimensional orthogonal coordinate system of the X-axis, the Y-axis, and the Z-axis fixed on a space, the tool coordinate system as a three-dimensional orthogonal coordinate system of an Xt-axis, a Yt-axis, and a Zt-axis of the end effector 250 attached to the tip end of the joint axis 230(6) of the robot 200, and the user coordinate system as a three-dimensional orthogonal coordinate system of an Xu-axis, a Yu-axis, and a Zu-axis. In the present embodiment, a positional correlation among the world coordinate system, the tool coordinate system, and the user coordinate system is provided in advance by well-known calibration. With this configuration, the above-described control apparatus 100 can control the position of the tip end portion, to which the end effector 250 is attached, of the robot 200 even by means of the position defined by any of the world coordinate system, the tool coordinate system, and the user coordinate system.

Note that A, B, and C shown in FIG. 4 indicate the rotation angles about the X-axis, the Y-axis, and the Z-axis.

As shown in FIG. 1, the robot 200 has a control unit 210. Further, the control unit 210 has a target position receiving unit 211, a drive control unit 212, the singularity determination unit 213, a kinematic control unit 214, a singularity passing pattern generation unit 215, a coordinate system control unit 216, a robot coordinate follow-up unit 217, a coordinate transmission unit 218, and a robot drive information output unit 219.

The control unit 210 has a CPU, a ROM, a RAM, a CMOS memory, etc., and these components are those well-known by those skilled in the art and configured communicable with each other via a bus.

The CPU is a processor that controls the robot 200 as a whole. The CPU reads, via the bus, a system program and an application program stored in the ROM, thereby controlling the entirety of the robot 200 according to the system program and the application program. With this configuration, the control unit 210 is, as shown in FIG. 1, configured to implement the functions of the target position receiving unit 211, the drive control unit 212, the singularity determination unit 213, the kinematic control unit 214, the singularity passing pattern generation unit 215, the coordinate system control unit 216, the robot coordinate follow-up unit 217, the coordinate transmission unit 218, and the robot drive information output unit 219.

The target position receiving unit 211 receives the target position transmitted by the target position transmission unit 122 of the control apparatus 100.

The drive control unit 212 drives the servomotor (not shown) of each joint axis 230 of the robot 200 such that the robot 200 moves to the target position received by the target position receiving unit 211.

The singularity determination unit 213 determines whether or not the robot 200 passes through the vicinity of the singularity when moving to the target position taught by the control apparatus 100, and in a case where the robot 200 passes through the vicinity of the singularity, transmits a notice that the robot 200 is in the vicinity of the singularity to the control apparatus 100.

Specifically, the singularity determination unit 213 determines, based on the rotation angle of each joint axis 230 included in a calculation result of the later-described kinematic control unit 214, whether or not the robot 200 is brought into such a posture that the rotation axes of two or more joint axes 230 are in line when moving to the target position, for example. Then, in a case where the robot 200 is brought into such a posture that the rotation axes of two or more joint axes 230 are in line, the singularity determination unit 213 determines that the robot 200 passes through the vicinity of the singularity. The singularity determination unit 213 transmits, to the control apparatus 100, the notice that the robot 200 is in the vicinity of the singularity.

The kinematic control unit 214 calculates the rotation angle of each joint axis 230 from the received target position based on the inverse kinematic calculation. The kinematic control unit 214 outputs the calculation result to the singularity determination unit 213, the singularity passing pattern generation unit 215, and the robot drive information output unit 219.

In the case of receiving the instruction for changing the posture of the robot 200 from the control apparatus 100, the singularity passing pattern generation unit 215 generates a motion plan based on the changed posture of the robot 200 such that the robot 200 passes through the vicinity of the singularity, and causes the drive control unit 212 to drive the robot 200 based on the generated motion plan.

Specifically, in the case of receiving the instruction for changing the posture, the singularity passing pattern generation unit 215 acquires information including the coordinate system set for the robot 200, the form indicating the posture of the robot 200, the number of rotations of each of the joint axes 230(4) to 230(6) corresponding to the wrist of the robot 200, and the position of the singularity from the kinematic control unit 214 and the coordinate system control unit 216. Using the acquired information, the singularity passing pattern generation unit 215 generates a plan for interpolation by the robot 200 and motion in the each-axis mode based on the changed posture of the robot 200 such that the robot 200 passes through the vicinity of the singularity. The singularity passing pattern generation unit 215 causes the drive control unit 212 to drive the robot 200 based on the generated motion plan. In the case of moving the robot 200 to the target position by interpolation by the robot 200 and the each-axis mode, the singularity passing pattern generation unit 215 transmits, to the control apparatus 100, a completion notice indicating completion of passage through the singularity.

Note that the changed posture of the robot 200 may be different from the posture instructed by the user of the control apparatus 100. For example, even in a case where the user presses the posture change key icon 341 on the robot position teaching screen 145 to select an instruction for changing the joint axis 230(5) of the wrist of the robot 200 from the upward orientation to the downward orientation or from the downward orientation to the upward orientation, the singularity passing pattern generation unit 215 may select such a posture that the joint axis 230(3) of the elbow of the robot 200 changes from the upward orientation to the downward orientation or from the downward orientation to the upward orientation. Alternatively, the singularity passing pattern generation unit 215 may select such a posture that the joint axis 230(1) of the orientation of the robot 200 changes from the forward orientation to the backward orientation or from the backward orientation to the forward orientation.

That is, it is difficult for a machine tool user unaccustomed to handling a teaching control board for a robot to determine whether or not the robot 200 can pass through the singularity by changing the robot 200 to any posture. For this reason, the singularity passing pattern generation unit 215 determines a posture optimal for passage through the singularity based on the information acquired from the kinematic control unit 214 and the later-described coordinate system control unit 216. With this configuration, the user's burden can be reduced.

The coordinate system control unit 216 controls the coordinate system set for the robot 200.

In the case of receiving the follow-up request from the control apparatus 100, the robot coordinate follow-up unit 217 acquires the coordinate information regarding the coordinate system set for the robot 200 from the coordinate system control unit 216, thereby setting the acquired coordinate information for the coordinate transmission unit 218 and notifying the control apparatus 100 of the acquired coordinate information. The robot coordinate follow-up unit 217 issues, for the control apparatus 100, a completion notice indicating that transmission of the coordinate information has been completed.

The coordinate transmission unit 218 transmits, to the control apparatus 100, the coordinate information set by the robot coordinate follow-up unit 217.

In the case of receiving a robot drive information request from the control apparatus 100, the robot drive information output unit 219 acquires the information (the form, the number of rotations, the coordinate system) from the kinematic control unit 214 and the coordinate system control unit 216. The robot drive information output unit 219 notifies the control apparatus 100 of the acquired information as the robot drive information.

<Teaching Processing by Control System 1>

Next, operation according to teaching processing by the control system 1 according to the present embodiment will be described.

Figure 5:
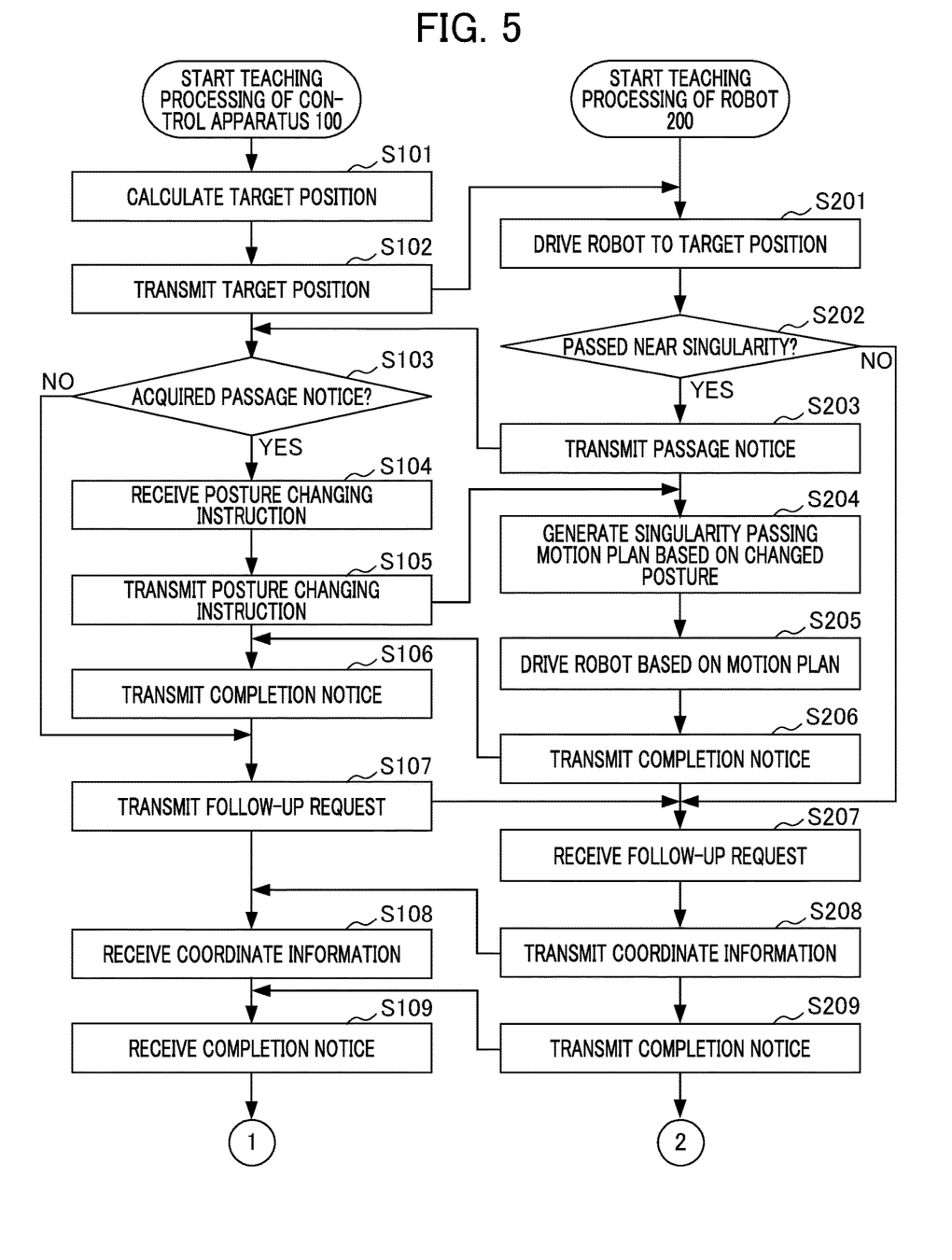
FIG. 5 is a flowchart for describing teaching processing by the control system.
Figure 6:
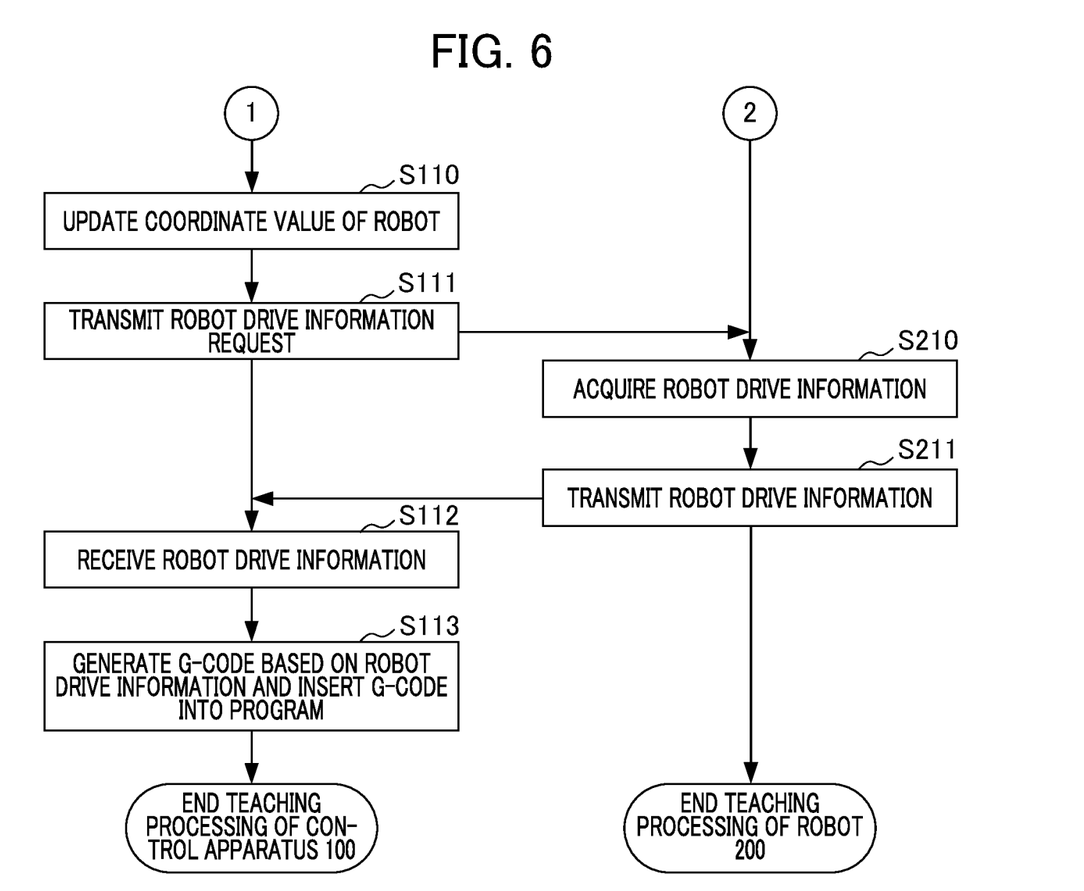
FIG. 6 is a flowchart for describing the teaching processing by the control system.

FIGS. 5 and 6 are flowcharts for describing the teaching processing by the control system 1. The flow described herein is repeatedly executed every time the user of the control apparatus 100 teaches the robot 200 the target position.

At Step S101, the interpolation calculation unit 121 of the control apparatus 100 calculates, by operation of the handle operation unit 110 by the user of the control apparatus 100, the target position of the robot 200 based on the pulse train signal received from the handle operation unit 110.

At Step S102, the target position transmission unit 122 transmits, to the robot 200, the target position calculated at Step S101.

At Step S201, the drive control unit 212 of the robot 200 drives the servomotor (not shown) of each joint axis 230 of the robot 200 such that the robot 200 moves to the target position received by the target position receiving unit 211.

At Step S202, the singularity determination unit 213 determines, based on the rotation angle of each joint axis 230 when the robot 200 moves to the target position calculated by the inverse kinematic calculation by the kinematic control unit 214, whether or not the robot 200 passes through the vicinity of the singularity. In a case where the robot 200 passes through the vicinity of the singularity, the processing proceeds to Step S203. In a case where the robot 200 does not pass through the vicinity of the singularity, the processing proceeds to Step S207.

At Step S203, the singularity determination unit 213 transmits, to the control apparatus 100, the notice that the robot 200 passes through the vicinity of the singularity.

At Step S103, the singularity information acquisition unit 123 of the control apparatus 100 determines whether or not the notice that the robot 200 passes through the vicinity of the singularity has been acquired from the robot 200. In a case where singularity information has been acquired, the processing proceeds to Step S104. In a case where the singularity information has not been acquired, the processing proceeds to Step S107.

At Step S104, in a case where the notice that the robot 200 passes through the vicinity of the singularity has been acquired at Step S103, the posture changing instruction unit 124 displays the message of the notice on the display unit 140, and receives the instruction for changing the posture of the robot 200 from the user of the control apparatus 100.

At Step S105, the singularity passing motion request unit 125 transmits the instruction for changing the posture to the robot 200 such that the robot 200 passes through the singularity in the posture instructed at Step S104.

At Step S204, in the case of receiving the instruction for changing the posture of the robot 200 from the control apparatus 100, the singularity passing pattern generation unit 215 of the robot 200 generates the plan for interpolation by the robot 200 and motion in the each-axis mode based on the changed posture of the robot 200 such that the robot 200 passes through the vicinity of the singularity.

At Step S205, the singularity passing pattern generation unit 215 causes the drive control unit 212 to drive the robot 200 based on the motion plan generated at Step S204.

At Step S206, in a case where the robot 200 has been moved to the target position by interpolation by the robot 200 and the each-axis mode, the singularity passing pattern generation unit 215 transmits, to the control apparatus 100, the completion notice indicating completion of passage through the singularity.

At Step S106, the singularity passing motion request unit 125 of the control apparatus 100 receives, from the robot 200, the completion notice indicating completion of passage through the singularity.

At Step S107, in a case where the completion notice has been received at Step S106, the robot coordinate follow-up request unit 126 transmits the follow-up request to the robot 200.

At Step S207, the robot coordinate follow-up unit 217 of the robot 200 receives the follow-up request from the control apparatus 100. The robot coordinate follow-up unit 217 acquires, from the coordinate system control unit 216, the coordinate information regarding the coordinate system set for the robot 200, thereby setting the acquired coordinate information for the coordinate transmission unit 218.

At Step S208, the coordinate transmission unit 218 transmits, to the control apparatus 100, the coordinate information set at Step S207.

At Step S108, the coordinate receiving unit 127 of the control apparatus 100 receives the coordinate information from the robot 200.

At Step S209, in a case where the coordinate information has been transmitted to the control apparatus 100 at Step S208, the robot coordinate follow-up unit 217 of the robot 200 transmits, to the control apparatus 100, the completion notice indicating that transmission of the coordinate information has been completed.

At Step S109, the robot coordinate follow-up request unit 126 of the control apparatus 100 receives, from the robot 200, the completion notice indicating that transmission of the coordinate information has been completed.

At Step S110 of FIG. 6, the follow-up execution unit 128 updates, in response to reception of the completion notice at Step S109, the coordinate value of the robot 200 based on the coordinate information received at Step S108.

At Step S111, the robot drive information request unit 129 transmits the robot drive information request to the robot 200.

At Step S210, the robot drive information output unit 219 of the robot 200 acquires, in response to reception of the robot drive information request from the control apparatus 100, acquires the robot drive information from the kinematic control unit 214 and the coordinate system control unit 216.

At Step S211, the robot drive information output unit 219 transmits, to the control apparatus 100, the robot drive information acquired at Step S210.

At Step S112, the robot drive information request unit 129 of the control apparatus 100 receives the robot drive information from the robot 200.

At Step S113, the robot G-code generation unit 130 generates the G-code corresponding to motion of the robot 200 based on the robot drive information acquired at Step S112, and inserts the generated G-code into the program.

With the above-described configuration, the control apparatus 100 of one embodiment transmits, to the robot 200, the target position of the robot 200 calculated based on the pulse train signal received by operation of the handle operation unit 110 by the user of the control apparatus 100. In the case of receiving, from the robot 200, the notice that the robot 200 passes through the vicinity of the singularity when moving to the transmitted target position, the control apparatus 100 displays the message of the notice on the display unit 140, and receives the instruction for changing the posture of the robot 200 from the user of the control apparatus 100. The control apparatus 100 transmits the instruction for changing the posture to the robot 200 such that the robot 200 passes through the singularity in the instructed posture. The control apparatus 100 acquires the robot drive information indicating the drive status of the robot 200 when the robot 200 passes through the singularity. The control apparatus 100 generates the G-code corresponding to motion of the robot 200 based on the acquired robot drive information, and inserts the generated G-code into the program.

With this configuration, the control apparatus 100 can easily produce the robot motion program without the need to consider the singularity.

One embodiment has been described above, but the control system 1, the control apparatus 100, and the robot 200 are not limited to those of the above-described embodiment. Variations, modifications, etc. made within a scope that an objective can be achieved are included.

In the above-described embodiment, the control apparatus 100 receives, as the instruction for changing the posture from the user, the instruction for changing the joint axis 230(5) of the wrist of the robot 200 from the upward orientation to the downward orientation or from the downward orientation to the upward orientation, the instruction for changing the joint axis 230(3) of the elbow of the robot 200 from the upward orientation to the downward orientation or from the downward orientation to the upward orientation, or the instruction for changing the orientation of the robot 200 from the forward orientation to the backward orientation or the backward orientation to the forward orientation, but the present disclosure is not limited to such a configuration. For example, the control apparatus 100 may merely receive only the instruction for changing the posture from the user.

This is because the singularity passing pattern generation unit 215 of the robot 200 determines, as described above, the optimal posture upon passage through the singularity based on the information acquired from the kinematic control unit 214 and the coordinate system control unit 216. Thus, the changed posture of the robot 200 might be different from the posture instructed from the control apparatus 100 in some cases. Moreover, it is difficult for the machine tool user unaccustomed to handling the teaching control board for the robot to determine the optimal posture when the robot 200 passes through the singularity. For these reasons, the user merely provides only the instruction for changing the posture so that the user's burden can be further reduced.

Note that each function included in the control system 1, the control apparatus 100, and the robot 200 in one embodiment can be implemented by hardware, software, or a combination thereof. Implementation by the software as described herein means that each function is implemented by reading and execution of a program by a computer.

The program can be stored using various types of non-transitory computer readable media, and can be supplied to the computer. The non-transitory computer readable media include various types of tangible storage media. Examples of the non-transitory computer readable media include magnetic recording media (e.g., a flexible disk, a magnetic tape, and a hard disk drive), magnetic optical recording media (e.g., a magnetic optical disk), a CD read only memory (CD-ROM), a CD-R, a CD-R/W, and semiconductor memories (e.g., a mask ROM, a programmable ROM (PROM), an erasable PROM (EPROM), a flash ROM, and a RAM). The program may be supplied to the computer via various types of transitory computer readable media. Examples of the transitory computer readable media include an electric signal, an optical signal, and an electromagnetic wave. The transitory computer readable medium can supply the program to the computer via a wired communication path such as an electric wire or an optical fiber or via a wireless communication path.

Note that the step of describing the program recorded in the recording medium includes, needless to say, not only processing performed in chronological order but also processing not necessarily performed in chronological order but executed in parallel or individually.

In other words, the control system, the control apparatus, and the robot of the present disclosure can be implemented as various embodiments having the following configurations.

(1) The control system 1 of the present disclosure is a control system including a control apparatus 100 that can teach a robot position and a robot 200 to be operated according to position teaching. The control apparatus 100 includes an operation unit 110 that teaches the robot 200 a position based on operation by a user, a posture changing instruction unit 124 that instructs the robot 200 to change the posture in the case of receiving, from the robot 200, a notice that the robot 200 passes through a singularity or the vicinity thereof when moving to the taught position, a singularity passing motion request unit 125 that transmits the instruction for changing the posture to the robot 200 such that the robot 200 passes through the singularity or the vicinity thereof in the posture instructed by the posture changing instruction unit 124, a robot drive information request unit 129 that requests the robot 200 to provide robot drive information indicating a drive status of the robot 200 when the robot 200 passes through the singularity or the vicinity thereof and acquires the robot drive information, and a robot G-code generation unit 130 that generates a G-code corresponding to motion of the robot 200 based on the robot drive information acquired by the robot drive information request unit 129 and inserts the generated G-code into a program. The robot 200 includes a drive control unit 212 that drives the robot 200, a singularity determination unit 213 that determines whether or not the robot 200 passes through the singularity or the vicinity thereof when moving to the position taught by the control apparatus 100 and transmits a notice that the robot 200 passes through the singularity or the vicinity thereof to the control apparatus 100 in a case where the robot 200 passes through the singularity or the vicinity thereof, a singularity passing pattern generation unit 215 that generates, in the case of receiving the instruction for changing the posture of the robot 200 from the control apparatus 100, a motion plan based on the changed posture such that the robot 200 passes through the singularity or the vicinity thereof and causes the drive control unit 212 to drive the robot 200 based on the generated motion plan, and a robot drive information output unit 219 that transmits the robot drive information to the control apparatus 100 in the case of receiving a request for the robot drive information from the control apparatus 100.

According to the control system 1, a robot motion program can be easily produced without the need to consider the singularity.

(2) In the control system 1 according to (1), the singularity passing pattern generation unit 215 causes the drive control unit 212 to drive the robot 200 in an orthogonal mode in a case where the robot 200 does not pass through the singularity or the vicinity thereof when moving to the taught position, and causes the drive control unit 212 to drive the robot 200 in an each-axis mode in a case where the robot 200 passes through the singularity or the vicinity thereof.

With this configuration, the control system 1 can switch, in a case where the robot 200 is at the singularity or in the vicinity thereof during position teaching for the robot 200 in an orthogonal coordinate system, the orthogonal coordinate system to an each-axis coordinate system so that the robot 200 can pass through and cross the singularity or the vicinity thereof.

(3) In the control system 1 according to (1) or (2), the robot drive information includes a form indicating the posture of the robot 200, the number of rotations of each of joint axes 230(4) to 230(6) corresponding to the wrist of the robot 200, a set coordinate system, and a coordinate value indicating the position and the posture of the robot 200.

With this configuration, the control system 1 allows even a machine tool user with no expertise in a robot to easily produce the robot motion program.

(4) In the control system 1 according to any one of (1) to (3), the posture change instructed by the posture changing instruction unit 124 is a change in the orientation of the wrist or the elbow of the robot 200 from an upward orientation to a downward orientation or from the downward orientation to the upward orientation, a change in the orientation of the robot 200 from a forward orientation to a backward orientation or the backward orientation to the forward orientation, or a change in the orientation of the robot 200 from a leftward orientation to a rightward orientation or from the rightward orientation to the leftward orientation.

With this configuration, when the robot 200 reaches the singularity or comes near the singularity during position teaching for the robot 200 in the orthogonal coordinate system, the control system 1 can cause, without user's trial and error, the robot 200 to perform motion such that the robot 200 passes through and crosses the singularity or the vicinity thereof, operability can be improved, and a user's burden can be reduced.

(5) The control apparatus 100 of the present disclosure includes an operation unit 110 that teaches a robot 200 as a control target a position based on operation by a user, a posture changing instruction unit 124 that instructs the robot 200 to change the posture thereof in the case of receiving, from the robot 200, a notice that the robot 200 passes through a singularity or the vicinity thereof when moving to the taught position, a singularity passing motion request unit 125 that transmits the instruction for changing the posture to the robot 200 such that the robot 200 passes through the singularity or the vicinity thereof in the posture instructed by the posture changing instruction unit 124, a robot drive information request unit 129 that requests the robot 200 to provide robot drive information indicating a drive status of the robot 200 when the robot 200 passes through the singularity or the vicinity thereof and acquires the robot drive information, and a robot G-code generation unit 130 that generates a G-code corresponding to the robot 200 based on the robot drive information acquired by the robot drive information request unit 129 and inserts the generated G-code into a program.

According to the control apparatus 100, advantageous effects similar to those of (1) can be provided.

(6) The robot 200 of the present disclosure is a robot operating according to position teaching by a control apparatus 100 that can teach the position of the robot (200). The robot 200 includes a drive control unit 212 that drives the robot 200, a singularity determination unit 213 that determines whether or not the robot 200 passes through a singularity or the vicinity thereof when moving to the position taught by the control apparatus 100 and transmits a notice that the robot 200 passes through the singularity or the vicinity thereof to the control apparatus 100 in a case where the robot 200 passes through the singularity or the vicinity thereof, a singularity passing pattern generation unit 215 that generates, in the case of receiving an instruction for changing the posture of the robot 200 from the control apparatus 100, a motion plan based on the changed posture such that the robot 200 passes through the singularity or the vicinity thereof and causes the drive control unit 212 to drive the robot 200 based on the generated motion plan, and a robot drive information output unit 219 that transmits robot drive information to the control apparatus 100 in the case of receiving a request for the robot drive information from the control apparatus 100, the robot drive information indicating a drive status of the robot 200 when the robot 200 passes through the singularity or the vicinity thereof.

According to the robot 200, advantageous effects similar to those of (1) can be provided.

EXPLANATION OF REFERENCE NUMERALS

1 control system
100 control apparatus
110 handle operation unit
124 posture changing instruction unit
125 singularity passing motion request unit
129 robot drive information request unit
130 robot G-code generation unit
200 robot
215 singularity passing pattern generation unit
219 robot drive information output unit

What is claimed is:

1. A control system that includes a control apparatus that is able to teach a robot position, and a robot to be operated according to position teaching, the control system comprising:
   wherein the control apparatus includes
   an operation unit that teaches the robot a position based on operation by a user,
   a posture changing instruction unit that instructs the robot to change a posture based on the operation by the user in a case of receiving, from the robot, a notice that the robot passes through a singularity or a vicinity of the singularity when moving to the taught position,
   a singularity passing motion request unit that transmits an instruction for changing the posture to the robot such that the robot passes through the singularity or the vicinity of the singularity in the posture instructed by the posture changing instruction unit,
   a robot drive information request unit that requests the robot to provide robot drive information indicating a drive status of the robot when the robot passes through the singularity or the vicinity of the singularity and acquires the robot drive information, and
   a robot G-code generation unit that generates a G-code corresponding to motion of the robot based on the robot drive information acquired by the robot drive information request unit and inserts the generated G-code into a program, and the robot includes a drive control unit that drives the robot, a singularity determination unit that determines whether or not the robot passes through the singularity or the vicinity of the singularity when moving to the position taught by the control apparatus and transmits a notice that the robot passes through the singularity or the vicinity of the singularity to the control apparatus in a case where the robot passes through the singularity or the vicinity of the singularity, a singularity passing pattern generation unit that generates, in a case of receiving the instruction for changing the posture of the robot from the control apparatus, a motion plan based on the changed posture such that the robot passes through the singularity or the vicinity of the singularity and causes the drive control unit to drive the robot based on the generated motion plan, and a robot drive information output unit that transmits the robot drive information to the control apparatus in a case of receiving a request for the robot drive information from the control apparatus, wherein the singularity passing pattern generation unit causes the drive control unit to drive the robot in an orthogonal mode in a case where the robot does not pass through the singularity or the vicinity of the singularity when moving to the taught position, and, in a case where the robot passes through the singularity or the vicinity of the singularity, causes the drive control unit to drive any one selected by the user from a joint axis of a wrist of the robot, a joint axis of an elbow of the robot, and a joint axis that changes an orientation of the robot without performing an inverse kinematic calculation to calculate, from the taught position, a rotation angle of each joint axis of the robot as does the orthogonal mode.

2. The control system according to claim 1, wherein the robot drive information includes a form indicating the posture of the robot, the number of rotations of each of a plurality of joint axes corresponding to a wrist of the robot, a set coordinate system, and a coordinate value indicating a position and the posture of the robot.

3. The control system according to claim 1, wherein the posture change instructed by the posture changing instruction unit is a change in an orientation of the wrist or an elbow of the robot from an upward orientation to a downward orientation or from the downward orientation to the upward orientation, a change in an orientation of the robot from a forward orientation to a backward orientation or the backward orientation to the forward orientation, or a change in the orientation of the robot from a leftward orientation to a rightward orientation or from the rightward orientation to the leftward orientation.

4. A control apparatus comprising:

an operation unit that teaches a robot as a control target a position based on operation by a user;

a posture changing instruction unit that instructs the robot to change a posture based on the operation by the user in a case of receiving, from the robot, a notice that the robot passes through a singularity or a vicinity of the singularity when moving to the taught position;

a singularity passing motion request unit that transmits an instruction for changing the posture to the robot such that the robot passes through the singularity or the vicinity of the singularity in the posture instructed by the posture changing instruction unit;

a robot drive information request unit that requests the robot to provide robot drive information indicating a drive status of the robot when the robot passes through the singularity or the vicinity of the singularity and acquires the robot drive information; and a robot G-code generation unit that generates a G-code corresponding to the robot based on the robot drive information acquired by the robot drive information request unit and inserts the generated G-code into a program, wherein the instruction for changing the posture causes the robot to drive in an orthogonal mode in a case where the robot does not pass through the singularity or the vicinity of the singularity when moving to the taught position, and, in a case where the robot passes through the singularity or the vicinity of the singularity, causes the robot to drive any one selected by the user from a joint axis of a wrist of the robot, a joint axis of an elbow of the robot, and a joint axis that changes an orientation of the robot without performing an inverse kinematic calculation to calculate, from the taught position, a rotation angle of each joint axis of the robot as does the orthogonal mode.

5. A robot that operates according to position teaching by a control apparatus that is able to teach a position of the robot based on operation by a user, the robot comprising:

a drive control unit that drives the robot;

a singularity determination unit that determines whether or not the robot passes through a singularity or a vicinity of the singularity when moving to the position taught by the control apparatus and transmits a notice that the robot passes through the singularity or the vicinity of the singularity to the control apparatus in a case where the robot passes through the singularity or the vicinity of the singularity;

a singularity passing pattern generation unit that generates, in a case of receiving an instruction for changing a posture of the robot from the control apparatus based on the operation by the user, a motion plan based on the changed posture such that the robot passes through the singularity or the vicinity of the singularity and causes the drive control unit to drive the robot based on the generated motion plan; and a robot drive information output unit that transmits robot drive information to the control apparatus in a case of receiving a request for the robot drive information from the control apparatus, the robot drive information indicating a drive status of the robot when the robot passes through the singularity or the vicinity of the singularity, wherein the singularity passing pattern generation unit causes the drive control unit to drive the robot in an orthogonal mode in a case where the robot does not pass through the singularity or the vicinity of the singularity when moving to the taught position, and, in a case where the robot passes through the singularity or the vicinity of the singularity, causes the drive control unit to drive any one selected by the user from a joint axis of a wrist of the robot, a joint axis of an elbow of the robot, and a joint axis that changes an orientation of the robot without performing an inverse kinematic calculation to calculate, from the taught position, a rotation angle of each joint axis of the robot as does the orthogonal mode.

* * * * *